(12) United States Patent
Kawakami et al.

(10) Patent No.: US 6,604,027 B1
(45) Date of Patent: Aug. 5, 2003

(54) ELECTRONIC CONTROL APPARATUS FOR VEHICLE

(75) Inventors: Takeshi Kawakami, Hyogo (JP); Norio Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/307,915

(22) Filed: Dec. 3, 2002

(30) Foreign Application Priority Data

Jul. 24, 2002 (JP) ........................................ 2002-214853

(51) Int. Cl.[7] ................................................. G06F 7/00
(52) U.S. Cl. ................................. 701/1; 701/36; 700/79
(58) Field of Search ............................... 701/1, 24, 36, 701/29, 37, 41, 51, 58, 67, 68, 70, 82, 101, 102, 115; 700/1, 79, 80, 81; 365/185.01–185.09; 713/2; 711/103; 714/2, 7, 23

(56) References Cited

U.S. PATENT DOCUMENTS

| | | | | |
|---|---|---|---|---|
| 6,009,372 A | * | 12/1999 | Baker et al. | 701/102 |
| 6,182,004 B1 | * | 1/2001 | Komori | 701/102 |
| 6,341,239 B1 | * | 1/2002 | Hayashi et al. | 700/79 |
| 6,525,280 B2 | * | 1/2003 | Terada et al. | 701/24 |
| 6,535,811 B1 | * | 3/2003 | Rowland et al. | 701/115 |

FOREIGN PATENT DOCUMENTS

JP          2-100742          *  4/1990

* cited by examiner

*Primary Examiner*—Richard M. Camby
(74) *Attorney, Agent, or Firm*—Sughrue Mion, PLLC

(57) ABSTRACT

An electronic control apparatus for a vehicle performs a rewrite execution permission/refusal determination while preventing leakage of a keyword or passcode without the need of grasping the keyword or passcode on the part of external equipment that requests rewriting the contents of the electronic control apparatus. Control programs and control data for controlling the vehicle are stored in a nonvolatile memory. The contents of the memory are rewritten by a rewriting part according to a request from the outside. A rewrite execution permission/refusal determination part creates a passcode which is uniquely defined in accordance with a prescribed rule from identification data which is decided upon receipt of a rewrite request, and makes a rewrite execution permission/refusal determination based on the result of collation between a passcode which has been created similarly by an external device from the identification data which has been sent to the external device and returned therefrom.

4 Claims, 4 Drawing Sheets

ELECTRONIC CONTROL APPARATUS FOR VEHICLE

BACKGROUND OF THE INVENTION

1. Field of the Invention

The present invention relates to a technique for rewriting nonvolatile memories in an electronic control apparatus for a vehicle such as a motor vehicle, and more particularly to the prevention of illegal rewriting thereof.

2. Description of the Related Art

Techniques for determination of illegal rewriting by using preset data (e.g., a keyword, a passcode, etc.) have been proposed as means for preventing the illegal rewriting of nonvolatile memories in an electronic control apparatus for a vehicle (hereinafter simply referred to as an ECU) in, for instance, Japanese Patent Application Laid-Open No. Hei 9-180486, Japanese Patent Application Laid-Open No. Hei 11-175331, etc.

According to an embodiment described in Japanese Patent Application Laid-Open No. Hei 9-180486, an arbitrary keyword indicative of rewriting the contents of a nonvolatile memory after a predetermined time has elapsed is registered in advance in a program in the ECU. For instance, in cases where the data in a ROM is desired to be rewritten after an internal combustion engine has been run for the predetermined time, the rewriting is executed when this keyword is input to the ECU from external equipment. A plurality of such keywords are provided according to the operating conditions of the engine.

In addition, according to an embodiment described in Japanese Patent Application Laid-Open No. Hei 11-175331, when an ECU receives a passcode sent from external equipment, it is determined whether the passcode thus received is in :agreement with a passcode stored in advance in a ROM in the ECU. If there is agreement between them, the execution of rewriting the ROM is permitted.

Since the conventional ECUs are constructed as mentioned above, there has been a problem that once the data (keyword or passcode) stored in advance in the ECUs is leaked, it is impossible to prevent illegal rewriting of the ECUs.

In particular, in cases where a function of rewriting a ROM is given to a lot of mass-produced ECUs, once a keyword or a passcode is leaked, it becomes impossible to prevent illegal rewriting to such mass-produced ECUs having the same keyword or passcode. On the other hand, if mutually different keywords or passcodes are set to the mass-produced individual ECUs, respectively, it is necessary for external equipment to grasp or store all the keywords or passcodes for the related ECUs, but it is substantially impractical to grasp or store, all the keywords or passcodes for mass-produced individual ECUs.

SUMMARY OF THE INVENTION

Accordingly, the object of the present invention is to provide an electronic control apparatus for a vehicle which is capable of preventing the leakage of a keyword or passcode in a reliable manner as well as making a determination as to whether the execution of rewriting is permitted or not, while eliminating the necessity of grasping such a keyword or passcode on the part of external equipment requesting the rewriting.

Bearing the above object in mind, the present invention resides in an electronic control apparatus for a vehicle which includes: a nonvolatile memory for storing control programs and control data for controlling the vehicle; a rewriting part for rewriting the contents of the nonvolatile memory in accordance with a request from the outside; and a rewrite execution permission/refusal determination part for creating a passcode which is uniquely defined in accordance with a prescribed rule from identification data which is decided upon receipt of a rewrite request, and for making a rewrite execution permission/refusal determination based on the result of collation between a passcode which has been created similarly by external equipment from the identification data which has been sent to the external device and returned therefrom. According to the above arrangement, there can be created, like random numbers, identification data and a passcode, which are different for each rewrite execution request, so that it is possible to maintain high security against illegal rewriting as an electronic control apparatus for use with a vehicle, in particular a motor vehicle. In addition, it becomes unnecessary for the external equipment, which performs rewriting of the contents of electronic control apparatuses, to grasp all the passcodes for the individual electronic control apparatuses to be rewritten.

In a preferred form of the invention, the electronic control apparatus further includes a timing element for controlling the vehicle. The identification data decided upon receipt of the rewrite request is created by utilizing the timing element.

In another preferred form of the invention, the electronic control apparatus further includes a rewrite execution permission/refusal determination memory for recording identification data response histories. The rewrite execution permission/refusal determination part omits the creation of a passcode for which a corresponding identification data response history has been already stored, or the rewrite execution permission/refusal determination part deletes the record of an identification data response history for which the collation of a corresponding passcode results in disagreement.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENT

Now, a preferred embodiment of the present invention will be described below in detail while referring to the accompanying drawings. Embodiment 1.

Figure 1:
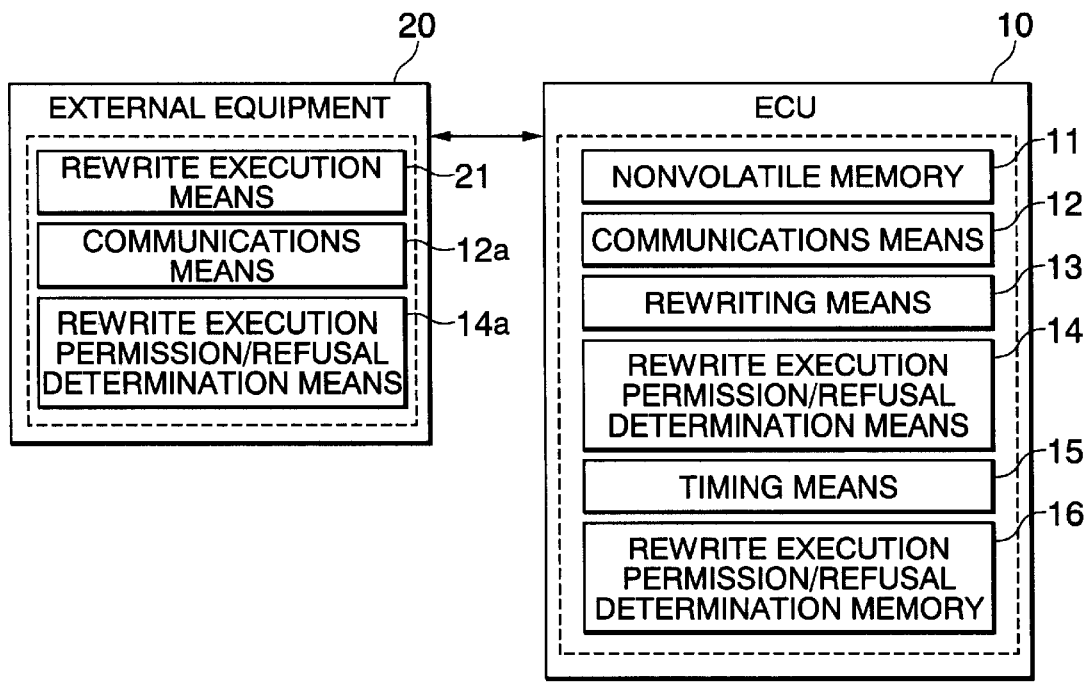
FIG. 1 is a view showing the configuration of an electronic control apparatus for a vehicle according to a first embodiment of the present invention.

FIG. 1 is a view that shows the configuration of an electronic control apparatus for a vehicle according to a first embodiment of the present invention. In FIG. 1, a reference numeral 10 designates an electronic control unit (ECU) that is included in the electronic control apparatus for a vehicle constructed according to the principles of the present invention, and a reference numeral 20 designates a piece of external equipment for rewriting control programs, control data, etc., for the ECU 10. The ECU 10 incorporates therein a nonvolatile memory 11 for storing control programs, control data, etc., a communications means 12 for performing communications with the external equipment 20, a rewriting means 13 for rewriting the control programs, the control data, etc., in the nonvolatile memory 11 in accordance with a request of the external equipment 20, a rewrite execution permission/refusal determination means 14 for determining whether the rewrite execution of the rewriting means 13 is permitted or refused, a timing means 15, and a rewritable rewrite execution permission/refusal determination memory 16.

The rewriting means 13 and the rewrite execution permission/refusal determination means 14 are stored in the nonvolatile memory 11 as a control program that is not the object to be rewritten. The communications means 12 is constituted by a communications modem, an I/O interface, etc., including programs in some cases. The rewrite execution permission/refusal determination memory 16 is constituted by a rewritable memory. The timing means 15 is constituted by a counter, a timer or the like which is formed of hardware or software.

The external equipment 20 includes a rewrite execution means 21 which is constituted by software for rewriting the contents of the ECU 10, a communications means 12a and a rewrite execution permission/refusal determination means 14a corresponding to the communications means 12 and the rewrite execution permission/refusal determination means 14, respectively, of the ECU 10.

Figure 2:
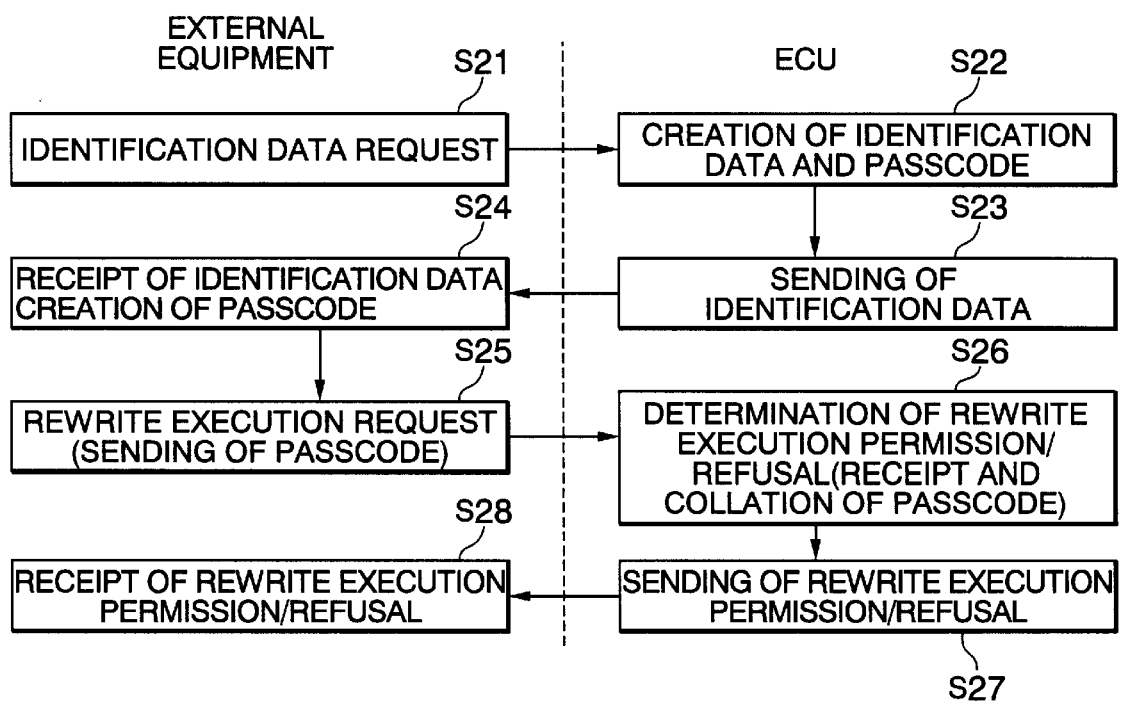
FIG. 2 is a flow chart illustrating an outline of a processing procedure for a rewrite execution determination performed between external equipment and an ECU in the electronic control apparatus according to the present invention.

FIG. 2 shows an outline of a processing procedure of a rewrite execution permission/refusal determination performed between the rewrite execution permission/refusal determination means 14 and 14a when the rewrite execution means 21 of the external equipment 20 makes a rewrite request to the ECU 10. When the external equipment 20 makes a request of rewriting to the ECU 10, it first requests identification data (step S21). Upon receipt of the request from the external equipment 20, the ECU 10 generates identification data and a passcode, which is created from the identification data according to a prescribed law or rule (step S22), and the identification data is sent to the external equipment 20 in step S23.

In step S24, the external equipment 20 receives the identification data and creates a passcode from the received identification data according to the law or rule similar to that on the side of the ECU 10. Subsequently, the external equipment 20 sends the passcode to the ECU 10, requesting the execution of rewriting thereof in step S25. Upon receipt of the passcode and the rewrite execution request from the external equipment 20, the ECU 10 collates the received passcode with the passcode created in step S22, according to the result of which it makes a determination as to whether the execution of rewriting is permitted or refused (step S26). That is, if both of the passcodes are in, agreement with each other as the result of the collation, rewriting is permitted. Thereafter, in step S27, the ECU 10 sends the permission or refusal of rewrite execution, which has been determined in step S26, to the external equipment 20, and the external equipment 20 receives the permission or refusal of rewrite execution thus sent (step S28).

Figure 3:
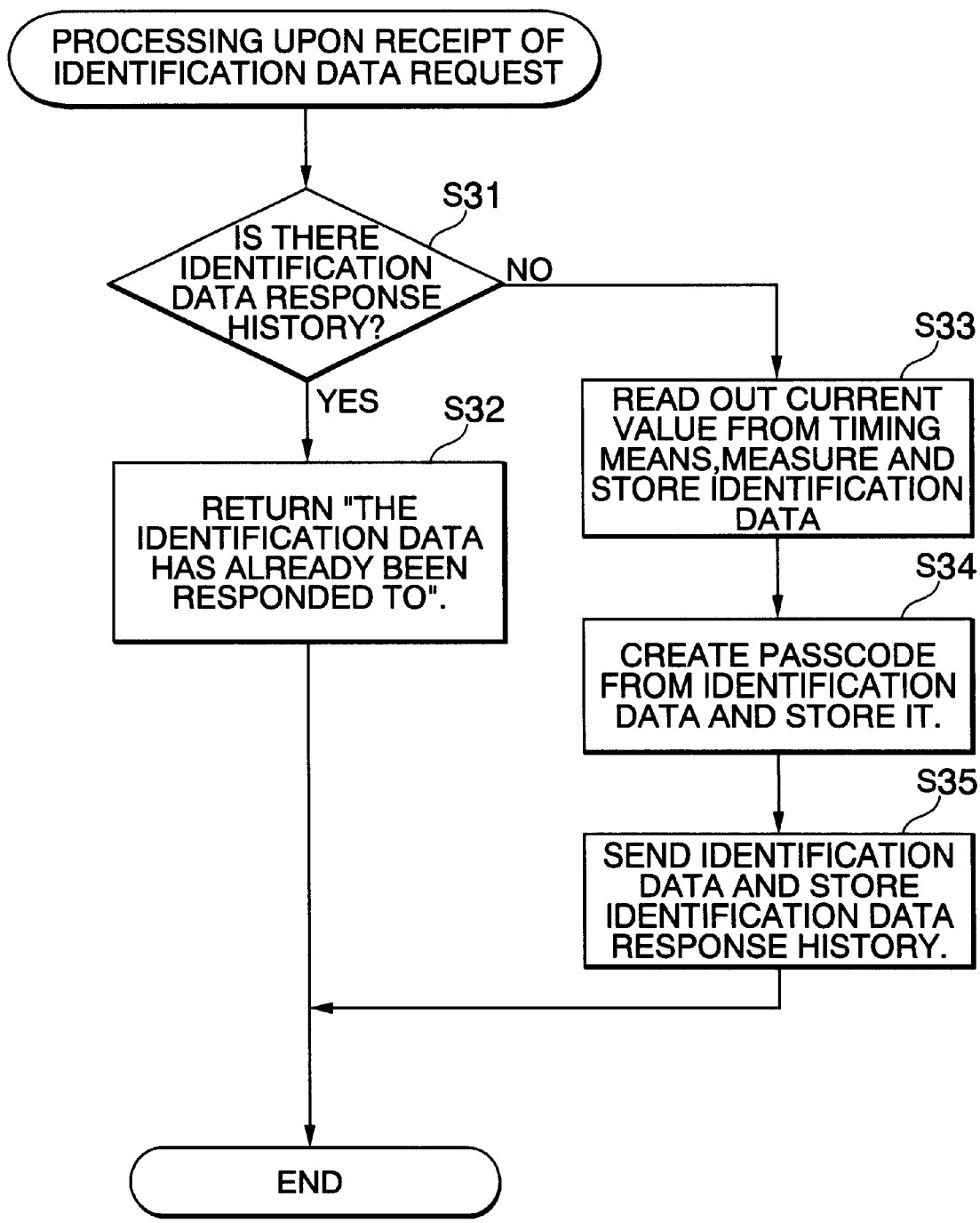
FIG. 3 is a flow chart illustrating the processing of the ECU in the electronic control apparatus according to the present invention when an identification data request is received by the ECU.
Figure 4:
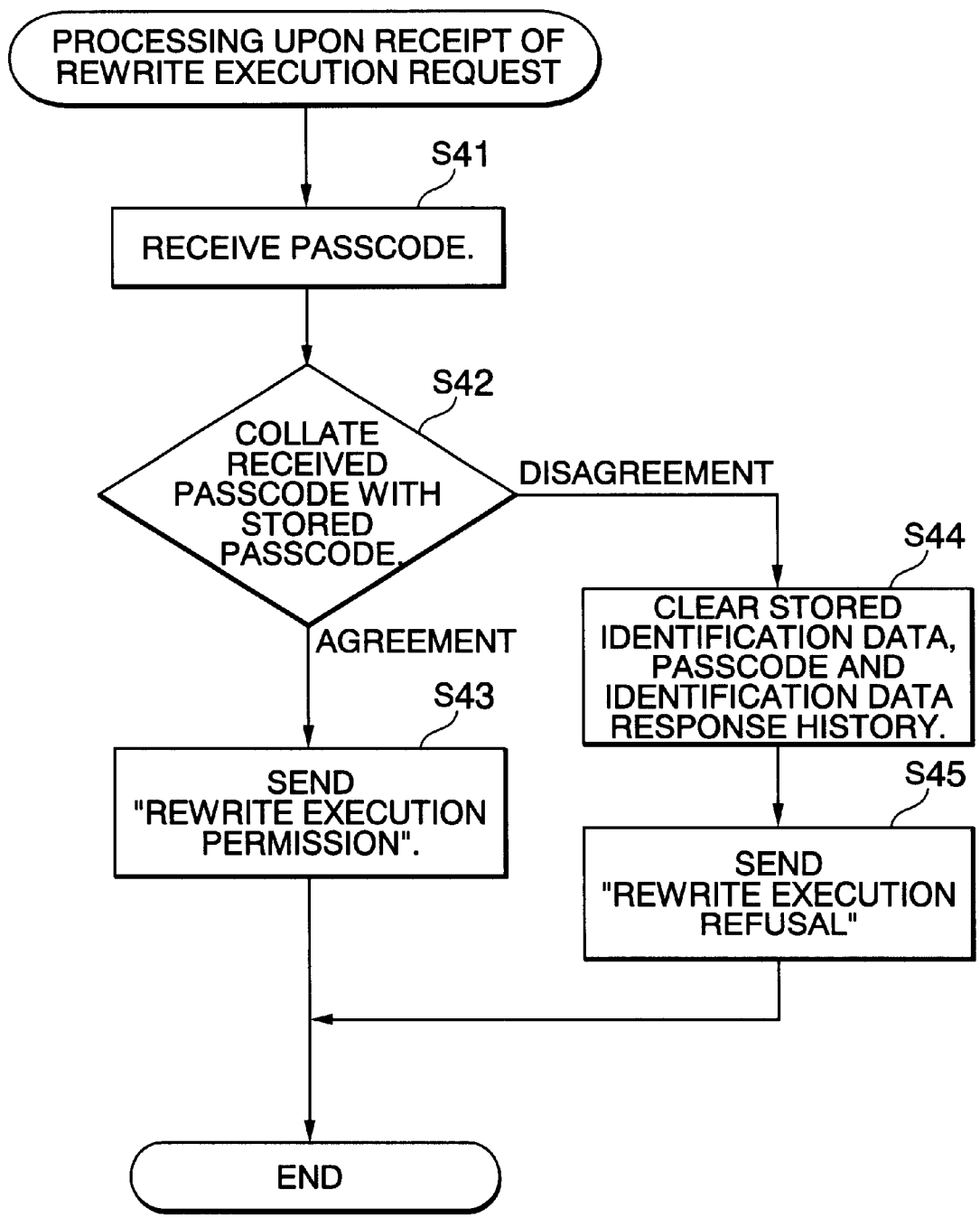
FIG. 4 is a flow chart illustrating the processing of the ECU in the electronic control apparatus according to the present invention when a passcode is received by the ECU.
Figure 5:
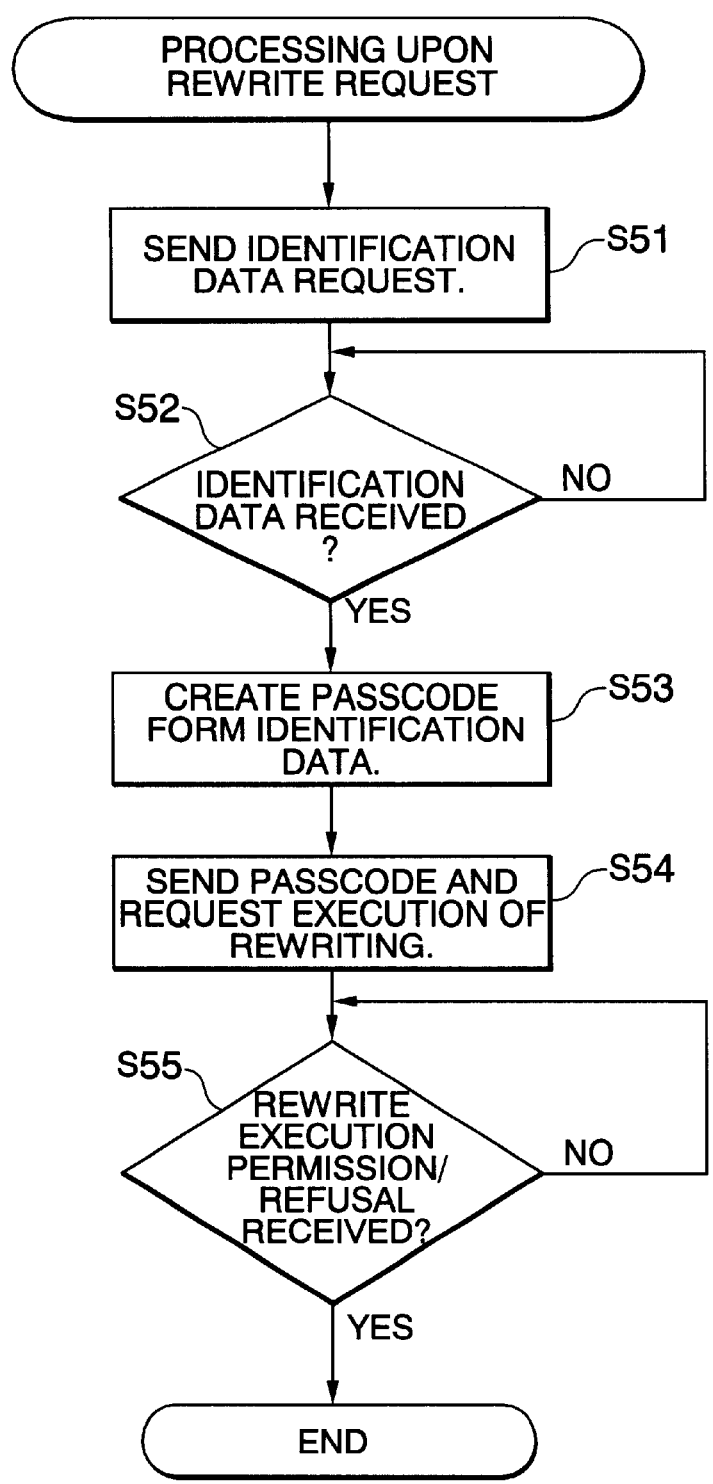
FIG. 5 is a flow chart illustrating the processing of the external equipment in the electronic control apparatus according to the present invention.

FIG. 3 and FIG. 4 show detailed operations carried out by the ECU 10, and FIG. 5 shows a detailed operation by the external equipment 20. FIG. 5 is a flow chart corresponding to steps S21, S24, S25 and S28 in FIG. 2. First of all, an identification data request is sent from the external equipment 20 to the ECU 10. This corresponds to step S21 in FIG. 2.

FIG. 3 is a flow chart that shows processing (i.e., corresponding to steps S22 and S23 in FIG. 2) when an identification data request from the external equipment 20 is received by the ECU 10. Specifically, the ECU 10 confirms the history of its response to identification data (step S31), and if the response history has been stored (i.e., YES in step S31), the flow proceeds to step S32 where an indication or information of "The identification data has already been responded to." is sent to the external equipment 20. The history of the ECU 10 having responded to the identification data is stored in the rewrite execution permission/refusal determination memory 16, and the following identification data and encrypted data (or code data) to be described later are also stored in this memory 16.

If, however, the response history has not been stored (i.e., NO in step S31), the flow proceeds to step S33 where the current value is read from the timing means 15, and identification data is created and stored based thereon. The timing means 15 cyclically measures or counts time at a constant interval or period from the start of operation of the ECU 10. According to one example of a method of generating identification data, the current value read out from the timing means 15 is assumed to be identification data. In step S34, a passcode is created from the identification data generated in step S33 according to the prescribed law or rule, and stored in the rewrite execution permission/refusal determination memory 16. Subsequently in step S35, the identification data generated in step S33 is sent to the external equipment 20, and at the same-time the identification data response history is stored in the rewrite execution permission/refusal determination memory 16.

In FIG. 5, ,upon receipt of the identification data from the ECU 10 (step S52), the external equipment 20 creates code data according to the law or rule similar to that in the ECU 10 (step S53). The external equipment 20 sends this code data to the ECU 10, thus making a rewrite execution request (step S54). These steps correspond to steps S24 and S25 in FIG. 2.

FIG. 4 is a flow chart that shows processing (i.e., corresponding to steps S26 and S27 in FIG. 2) when a rewrite execution request from the external equipment 20 is received by the ECU 10. First of all, the ECU 10 receives the passcode sent from the external equipment 20 (step S41), and then collates it with the passcode that has been created and stored in the rewrite execution permission/refusal determination memory 16 in step S34 (step S42). If these passcodes are in agreement with each other (i.e., "agreement" in step S42), the flow proceeds to step S43 where an indication or command of "rewrite execution permission" is sent to the external equipment 20.

In the ECU 10, if the passcodes are in disagreement with each other (i.e., "disagreement" in step S42), the flow proceeds to step S44 where the identification data, the passcode and the identification data response history stored in the rewrite execution permission/refusal determination memory 16 are cleared (deleted). Then in step S45, an indication or command of "rewrite execution refusal" is sent to the external equipment 20.

In FIG. 5, the external equipment 20 receives the indication or command of "rewrite execution permission" or "rewrite execution refusal" (step S55). This corresponds to step S28 in FIG. 2.

Here, note that the timing means 15 is used for creating identification data, but in the write permission/refusal determination, the timing means 15 only reads out the current value when the external equipment 20 requests identification data. Accordingly, the timing means 15 may comprise any existing timing means that is used by the ECU 10 for measuring an input signal or controlling an output signal so as to control an associated internal combustion engine or the like.

As described in the foregoing, the present invention provides the following excellent advantages.

According to the present invention, there is provided an electronic control apparatus for a vehicle comprising: a nonvolatile memory for storing control programs and control data for controlling the vehicle; rewriting means for rewriting the contents of the nonvolatile memory in accordance with a request from the outside; and rewrite execution permission/refusal determination means for creating a passcode which is uniquely defined in accordance with a prescribed rule from identification data which is decided upon receipt of a rewrite request, and for making a rewrite execution permission/refusal determination based on the result of collation between a passcode which has been created similarly by external equipment from the identification data which has been sent to the external device and returned therefrom. With this arrangement, there can be created like random numbers identification data and a passcode, which are different for each rewrite execution request, so that it is possible to maintain high security against illegal rewriting as an electronic control apparatus for use with a vehicle, in particular a motor vehicle. In addition, it becomes unnecessary for the external equipment, which performs rewriting of the contents of electronic control apparatuses, to grasp all the passcodes for the individual electronic control apparatuses to be rewritten.

Preferably, the electronic control apparatus for a vehicle further comprises timing means for controlling the vehicle, wherein the identification data decided upon receipt of the rewrite request is created by utilizing the timing means. Thus, the timing means used for controlling an object can also be utilized as the timing means used for creating identification data, or vice versa. Accordingly, it is possible to provide an illegal rewriting preventive means at a low cost without using additional timing means. Moreover, since identification data is created by utilizing the timing means incorporated in the electronic control apparatus, the effect of preventing illegal rewriting can be further improved.

Preferably, the electronic control apparatus for a vehicle further comprises rewrite execution permission/refusal determination storage means for recording identification data response histories. The rewrite execution permission/ refusal determination means omits the creation of a passcode for which a corresponding identification data response history has been already stored, or the rewrite execution permission/refusal determination means deletes the record of an identification data response history for which the collation of a corresponding passcode results in disagreement. Thus, it is possible to improve the efficiency of processing as well as to prevent illegal rewrite requests which require one-by-one collation of passcodes.

While the invention has been described in terms of a preferred embodiment, those skilled in the art will recognize that the invention can be practiced with modifications within the spirit and scope of the appended claims.

What is claimed is:

1. An electronic control apparatus for a vehicle comprising:

a nonvolatile memory for storing control programs and control data for controlling the vehicle;

rewriting means for rewriting the contents of said nonvolatile memory in accordance with a request from the outside; and rewrite execution permission/refusal determination means for creating a passcode which is uniquely defined in accordance with a prescribed rule from identification data which is decided upon receipt of a rewrite request, and for making a rewrite execution permission/refusal determination based on the result of collation between a passcode which has been created similarly by external equipment from said identification data which has been sent to said external device and returned therefrom.

2. The electronic control apparatus for a vehicle according to claim 1, further comprising timing means for controlling the vehicle, wherein said identification data decided upon receipt of the rewrite request is created by utilizing said timing means.

3. The electronic control apparatus for a vehicle according to claim 1, further comprising rewrite execution permission/ refusal determination storage means for recording identification data response histories, wherein said rewrite execution permission/refusal determination means omits the creation of a passcode for which a corresponding identification data response history has been already stored, or said rewrite execution permission/refusal determination means deletes the record of an identification data response history for which the collation of a corresponding passcode results in disagreement.

4. The electronic control apparatus for a vehicle according to claim 2, further comprising rewrite execution permission/ refusal determination storage means for recording identification data response histories, wherein said rewrite execution permission/refusal determination means omits the creation of a passcode for which a corresponding identification data response history has been already stored, or said rewrite execution permission/refusal determination means deletes the record of an identification data response history for which the collation of a corresponding passcode results in disagreement.

* * * * *